INVENTOR.
EUGENE A. LEVY
BY
Herzig, Walsh & Blackham
ATTORNEYS ived Apr. 1, 1969

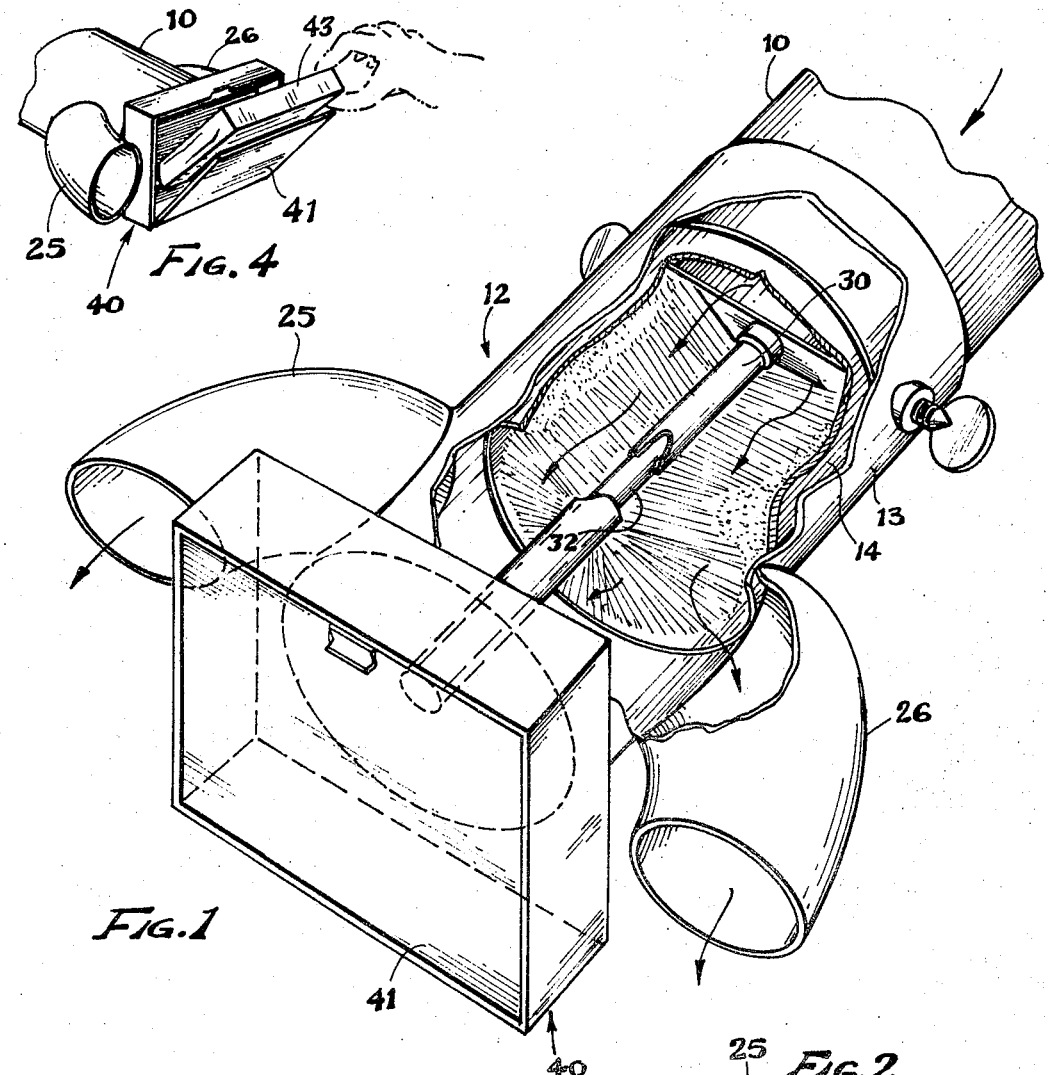
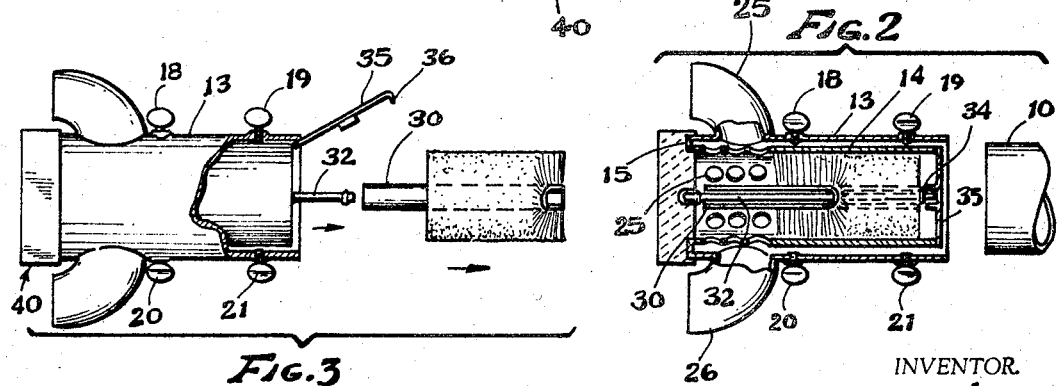

3,435,597
ANTI-SMOG DEVICE
Eugene A. Levy, 19600 Vose St., Reseda, Calif. 91335
Filed Sept. 1, 1966, Ser. No. 576,597
Int. Cl. B01d 35/18, 35/10
U.S. Cl. 55—269                  2 Claims

ABSTRACT OF THE DISCLOSURE

The invention is an anti-smog device of the type particularly adapted for use with automobile exhausts. The device is one that combines filtering and precipitation to accomplish its purpose. The filter may be of the bristle brush type and generally cylindrical in form to fit within a cylinder. The cylinder fits within the exhaust or tail pipe of the automobile. Cooling means which may be any of various types, is provided and positioned to produce cooling effect in the vicinity of the filter so that the purposes are achieved by the combined filtering and precipitation. The filter may be at the after or forward end of the cylinder holding the filter which fits into the tail pipe. In the form of device wherein the refrigerating or cooling unit is at the after end, the unit is provided with side or lateral exhaust arms for the escape of the filtered gases.

---

This invention relates to an anti-smog device, particularly adaptable for use as an automobile exhaust anti-smog device. The anti-smog device of the invention might, however, be utilized in other applications. Its primary purpose is to prevent the emission into the atmosphere of those contaminants which contribute to smog conditions that originate in the type of gasses that are in the exhaust of an automobile or in similar or comparable types of exhaust emissions. The problem of smog, as for example, in the Los Angeles area, is now a familiar one, and large volumes of information relative to it have been published. It is generally accepted that emissions from automobile exhausts are a substantial contributing factor to the contaminants and pollutants that create the smog conditions. Various approaches have been suggested to the problem of equipping automobiles with devices that will reduce or eliminate the emission of these contaminants into the atmosphere. Such proposals have generally taken the form of various types of filters, after-burners, electrical precipitators, etc., none of which have been fully effective.

The exhaust discharge pollutants and contaminants may include particulates of very small size. The smaller of these particulates are capable of penetrating to all respiratory organs. Exhaust emissions of course, also include among other things, unburned gasoline hydrocarbons and oxides of nitrogen which are acted upon by the sun and as a result contribute to smog conditions. The primary object of the invention is to prevent or reduce the discharge into the atmosphere of contaminants and pollutants which contribute to smog conditions. It is a further object of the invention to provide a simplified but effective device for accomplishing this purpose and one which may be either installed on an existing automobile exhaust pipe or may be a built-in installation.

The device of the invention is constructed to accomplish its purpose by combined filtering and precipitation of the contaminants, the precipitation being brought about by cooling of the exhaust gasses to a temperature of substantially 33.3 degrees F. Preferably the filter used is of the bristle type constructed on the order of, or resembling an ordinary bottle brush. Cooling effect is produced in the region of the filter by transferring heat by conduction away from that area to a cooling unit. Preferably the source of cooling is a simplified one which may be simply a container of Dry Ice or a mechanical refrigerating unit. The device is constructed so that the filter unit is very easily replaceable or renewable. One of the objects is to realize an inexpensive and simplified construction wherein the desired functions of the device are effectively realized while retaining the capability of simplified replacement of the filter unit.

Further objects and additional advantages of the invention will become apparent from the following detailed description and annexed drawings wherein:

FIGURE 1 is a perspective view of a preferred form of the invention;

FIGURE 2 is a sectional view of the unit of FIGURE 1;

FIGURE 3 is a view similar to FIGURE 2 showing removal of the filter unit;

FIGURE 4 is a detail view showing removability of the cooling unit of the device of FIGURE 1;

Figure 5:
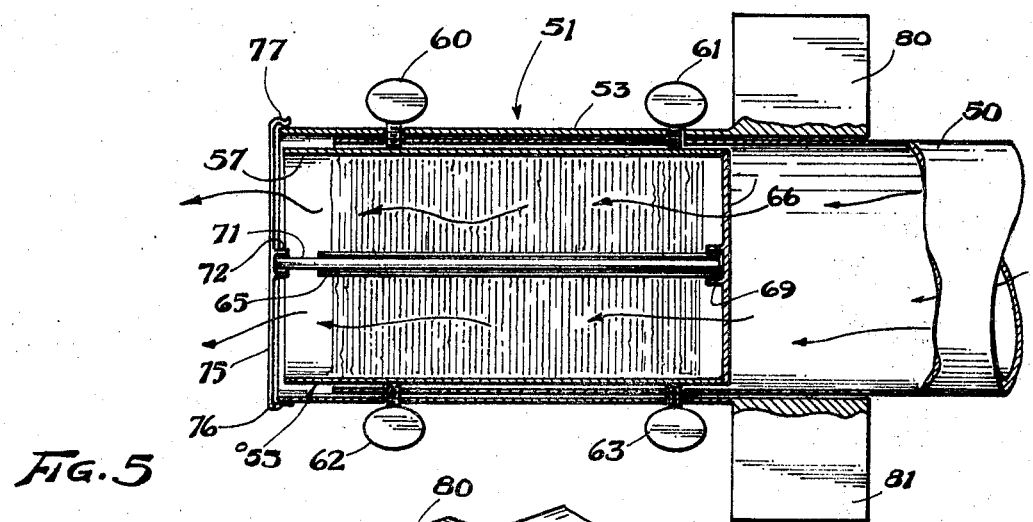
FIGURE 5 is a sectional view of a modified form of device.

Referring now more in detail to FIGURES 1, 2, 3, and 4 of the drawings, numeral 10 designates the exhaust or tail pipe of an automobile. Numeral 12 designates generally a preferred form of the invention. It comprises a cylindrical body 13 of a size to fit over the exterior of the tail pipe 10. Within the cylindrical body 13 is a second spaced cylindrical member 14 which is secured to the outer body at the outer end as shown at 15. The tail pipe 10 is insertable between the inner and outer cylinders 13 and 14 and the device can be secured to the tail pipe by the thumb screws as designated at 18, 19, 20, and 21.

The body 13 has circular discharge pipes in the form of side arms 25 and 26 which communicate with the space between the body 13 and the inner cylinder 14. The gasses discharge into the inner cylinder 14 which has orifices in it as designated at 27, so that the gasses can pass therethrough into the space between the body 13 and cylinder 14 and then into the discharge pipes 25 and 26 which discharge to the rear.

A filter unit is supported within the inner cylinder 14. Preferably this unit takes the form of a cylindrical bristle brush resembling a bottle cleaner brush. The bristles are mounted on a central tube as designated at 30, the bristles being of a suitable type to effectuate their purpose. The tube 30 of the filter is slidably mounted on a central stem 32. The stem 32 is held at the inner end by means of a bushing 34 on a transverse bracket member 35 which extends across the inner end of the inner cylinder 14. This bracket may be hinged at one end with a spring clip 36 at the other end to hold it in engagement with the inner edge of cylinder 14.

At the outer end of the device there is mounted a housing or container 40 for the means or unit that produces the cooling effect. The housing 40 may have a hinged cover as shown at 41 and many contain a removable packet or unit containing Dry Ice as designated at 43. As an alternative, the housing 40 may contain a mechanical refrigerating unit or simply the cooling element thereof and this unit may be mounted on a slide-out tray or drawer. The housing 40 and cooling unit are constructed so that the cooling effect is exerted on the gasses being discharged through the anti-smog device and particularly in the area of the filter. To facilitate this purpose the rod or stem 32 is made of material which is highly heat conductive and the tube 30 is made of a similar material so as to cause a rapid transfer of heat by conduction from the area of the filter. The inner cylinder 14 is also made of a heat conductive material to facilitate transfer of heat by conduction rearwardly to the cooling means in the housing 40. Preferably the cooling means or unit is constructed to realize a reduction in temperature of gasses being discharged through the device to a temperature of substantially 33.3 degrees F., which is the temperature at which ice begins to form. The effect of reduction of temperature in combination with the filter means is to remove from the gasses being discharged, the pollutants and contaminants which otherwise would be contributing factors to atmospheric smog conditions. The reduced temperature and filter combine to effect removal of the contaminants by condensation, precipitation, and filtration.

FIGURE 3 illustrates the ease of removal of the device from the tail pipe 10 and replacement of the filter cartridge. The bracket 35 is simply moved to the position shown in FIGURE 3 which allows the cartridge with the tube 30 to be slipped off the central stem 32. A new cartridge can then be slipped on; the bracket 35 is returned to its original position with the stem 32 held in the bushing 34 and the device may then be remounted on the tail pipe 10.

Figure 6:
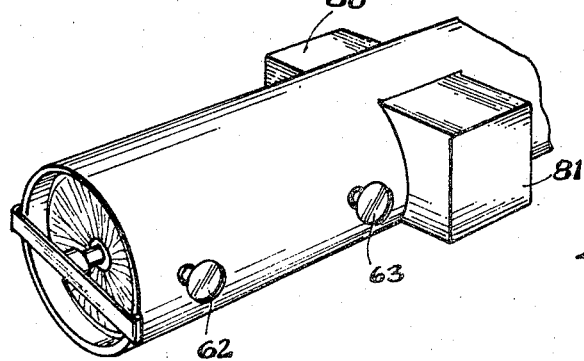
FIGURE 6 is a perspective view of the device of FIGURE 5.
Figure 7:
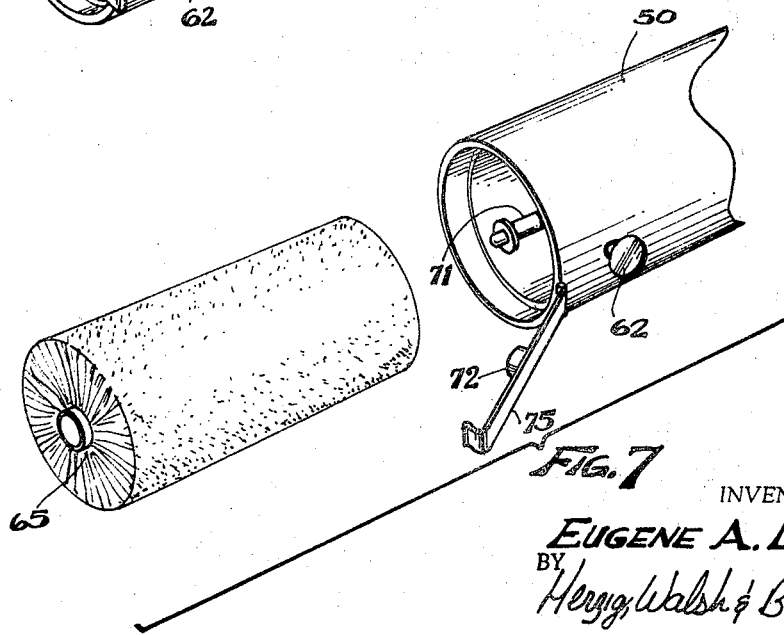
FIGURE 7 is a view like that of FIGURE 6 showing the removal of the filter unit.

FIGURES 5, 6 and 7 show a modified form of the invention which may either be installed on an existing automobile tail pipe or may be originally constructed as a built-in device. In this form of the invention an automobile tail pipe is designated at 50. The anti-smog device is designated generally at 51. It comprises an outer cylindrical member 53 of a size to fit over the tail pipe 50. The filter cartridge is designated generally at 55. It comprises a cylindrical member 57 that fits inside the tail pipe 50. The inner and outer cylindrical members 53 and 57 are held in position relative to the end of the tail pipe by thumb screws 60, 61, 62, and 63 which extend through openings in cylinder 53 and in the end of the tail pipe and bear against the exterior cylinder 57.

The filter cartridge comprises a central tube 65 having radially extending bristles like the filter unit of the previous embodiment. At the inner end of the cylinder 57 is a transverse hinged bracket member 66 having a clip at one end to engage the end of the cylinder 57. This bracket has central bushing 69 which supports one end of the tube 65. The tube 65 is slidably supported on a central rod or stem 71. The outer end of this rod or stem is supported in a bushing 72 carried at the center of an end bracket support 75 which is hinged as shown at 76 to the end of the cylinder 53. At its other end the bracket 75 has a clip 77 for engagement with an end edge of the outer cylinder 53.

At the inner end of the cylinder 53 is an integral housing having extending portions as shown at 80 and 81, which contains the cooling means or cooling unit. The cooling means or cooling unit may be like that of the previous embodiment.

The operation of the present embodiment is quite similar to that of the previous embodiment. In the present embodiment the cooling unit in the housing 80–81 exerts direct cooling effect on the gasses being discharged through the tail pipe 50 and through the filter unit. The housing 80–81 instead of having a configuration as shown, it may be a configuration in the form of a ring going completely around the tail pipe 50 to thereby exert cooling effect all the way around it. Cooling effect is also exerted on the filter unit by way of transfer of heat by conduction through the material of the cylinder 53, the tail pipe and the cylinder 57 back to the region of the cooling unit.

FIGURE 7 illustrates the manner of replacement of a filter unit or cartridge. The bracket 75 is simply unclipped and moved around its hinge and tube 65 of the filter unit and is slipped off the rod 71. A new filter unit may then be slipped over stem 71. It will be observed that the filter unit may be removed for cleaning or replacement without disassembling the unit, but simply by unclipping the bracket 75 and pulling out the filter. It is not necessary to remove the unit from the tail pipe.

From the foregoing those skilled in the art will observe that the invention as described herein achieves and realizes all of the objects and advantages of the invention as outlined in the foregoing, as well as having many additional advantages that are apparent from the detailed description.

What is claimed is:

1. A smog control device for purifying exhaust gasses discharging through a conduit, said device comprising filter means positioned in the conduit, and cooling means associated with the conduit and filter means whereby to produce a cooling and precipitating effect on the exhaust gasses in the vicinity of the filter means, the said cooling means comprising a housing and means positioned relative to the gas conduit to produce cooling effect in the region of the said filter, said device comprising a cylinder of a size to engage with and to be attached to a gas discharge pipe, the cylinder having the filter means therewithin and carrying the said cooling means, said device having an inner concentric cylinder positioned to have the gas discharge pipe extend between the inner and outer cylinders and to be secured therein.

2. A device as in claim 1 including an axial supporting rod in said inner cylinder having the filter means slidably supported thereon.

References Cited

UNITED STATES PATENTS

| 692,597 | 2/1902 | Baum | 55—269 |
|---|---|---|---|
| 1,196,169 | 8/1916 | Stillman | 55—269 |
| 1,250,451 | 12/1917 | Harrod | 55—267 |
| 1,388,480 | 8/1921 | Paris | 55 |
| 1,577,867 | 3/1926 | Moyer | 55—268 |
| 1,947,797 | 2/1934 | Radford | 55—507 X |
| 2,538,450 | 1/1951 | Gardner | 55 |
| 2,575,499 | 11/1951 | Manow | 55—481 X |
| 2,738,854 | 3/1956 | Thrower | 55 |
| 2,838,131 | 6/1958 | Peterson | 55—329 X |
| 2,922,489 | 1/1960 | Hollingsworth | 55—477 X |
| 2,984,359 | 5/1961 | O'Brien | 210—460 X |
| 3,100,146 | 8/1963 | Auntingtor | 55 |
| 3,157,479 | 11/1964 | Boles | 55 |
| 3,307,336 | 3/1967 | Dewsberry | 55—337 |

FOREIGN PATENTS

| 582,971 | 10/1924 | France. |
| 866,634 | 5/1941 | France. |
| 866,661 | 5/1941 | France. |
| 875,107 | 6/1942 | France. |
| 259,012 | 5/1927 | Italy. |

HARRY B. THORNTON, *Primary Examiner.*

DENNIS E. TALBERT, Jr., *Assistant Examiner.*

U.S. Cl. X.R.

55—477, 490; 210—460, 318, 483